United States Patent [19]

Jones

[11] Patent Number: 5,269,484
[45] Date of Patent: * Dec. 14, 1993

[54] HOLDER FOR ELECTRONIC EQUIPMENT ACCESSORIES

[76] Inventor: Wally W. Jones, 32228 Glenbrook St., Union City, Calif. 94587

[*] Notice: The portion of the term of this patent subsequent to Jul. 7, 2009 has been disclaimed.

[21] Appl. No.: 901,697

[22] Filed: Jun. 22, 1992

Related U.S. Application Data

[62] Division of Ser. No. 638,999, Dec. 17, 1991, Pat. No. 5,127,615.

[51] Int. Cl.⁵ .................................................. A47F 7/00
[52] U.S. Cl. ...................................... 248/172; 211/13; 248/205.2; 248/205.3
[58] Field of Search ................... 211/13, 43; 248/172, 248/176, 205.2, 205.3, 309.1, 316.1, 316.6, 678, 910, 918

[56] References Cited

U.S. PATENT DOCUMENTS

| | | | |
|---|---|---|---|
| 4,686,745 | 8/1987 | Butler | 24/17 B |
| 4,838,505 | 6/1989 | Lowe | 248/176 |
| 4,848,609 | 7/1989 | Meghnot | 211/13 |
| 4,852,746 | 8/1989 | Wells et al. | 248/205.2 X |
| 4,856,658 | 8/1989 | Novak | 211/13 |
| 4,893,222 | 1/1990 | Mintzer | 211/13 X |
| 4,911,389 | 3/1990 | Self | 248/205.2 X |
| 4,991,817 | 2/1991 | VonKleist et al. | 248/205.2 X |
| 4,991,892 | 2/1991 | Burrell | 248/205.2 X |
| 5,125,516 | 6/1992 | McKenna | 248/205.2 X |
| 5,127,615 | 7/1992 | Jones | 248/205.2 X |

Primary Examiner—David A. Scherbel
Assistant Examiner—Derek J. Berger
Attorney, Agent, or Firm—David Pressman

[57] ABSTRACT

A holder for accessories for electronic equipment, such as remote controls (RCs) (30) for televisions, VCRs, audio receivers, etc., and schedule or guidebooks (62) for such equipment comprises a cradle (56) of variable width and length for holding one or more RCs and an underlying holder (34) for the guidebook. The cradle comprises a plurality of L-shaped members (10U, 10L; 80U, 80L) whose long portions (12, 82) overlap to form the bottom of the cradle and are clampable together in a range of positions, e.g., by means of screws (18) or hook-and-loop (H&L) fasteners (22) or double-stick sided tape. The short portions (14, 84) of the L-shaped members stand upright in a spaced relation to form the sides of the cradle. Plural shorter L-shaped members can be used with a provision for adjustable spacing so that the length of the cradle can also be adjusted. The RC units are positioned on the floor of the cradle, side-by-side, and may be held thereto by means of H&L fasteners (24). The underlying guidebook holder may be used alone or it may be attached to the RC-holding cradle by H&L fasteners (32, 54, 79), double-stick-sided tape, or integrally. Additional holders may be stacked below the first one. It comprises a plurality of plates (36, 37, 38) with attached sides so as to form a rectangular cavity. The bottom of the cavity may be closed by end flaps (42, 46, 68) of the plates or by a clamp (70) or a torsion spring. The plates may be hinged and held together by a coil or torsion spring (72) such that they can be opened in clamshell fashion.

7 Claims, 8 Drawing Sheets

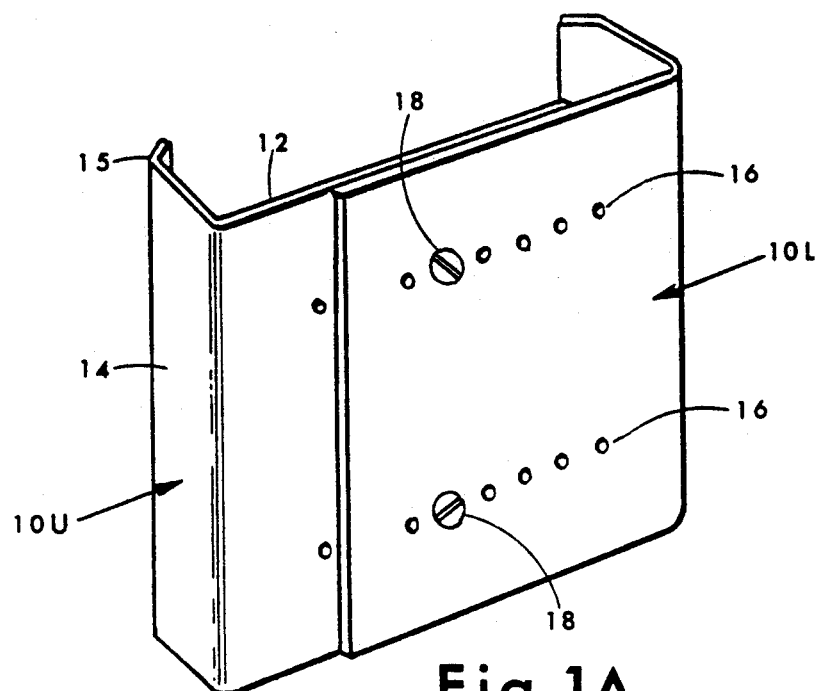
Fig.1A
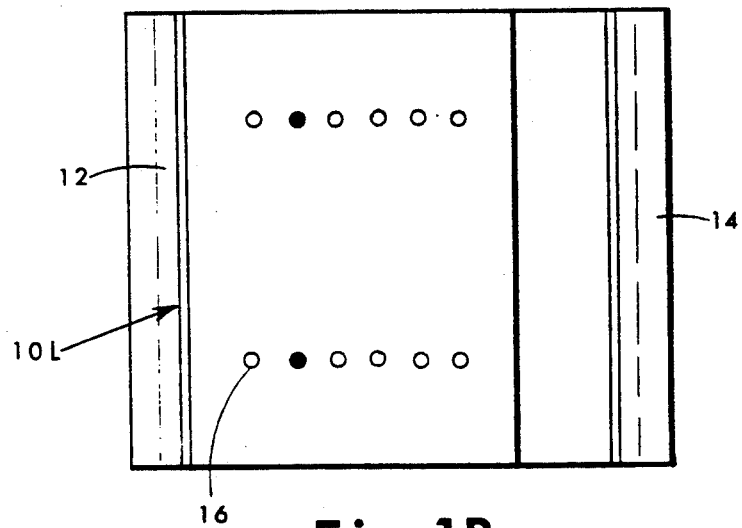
Fig.1B
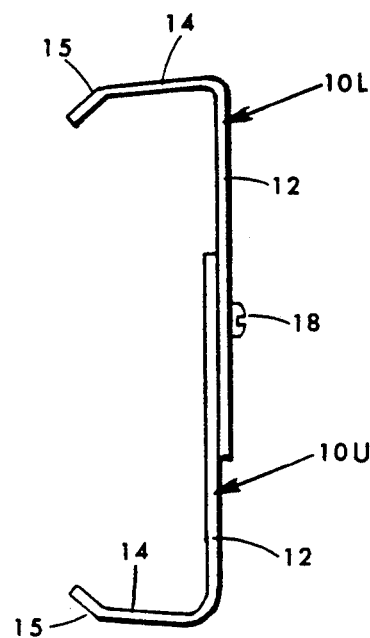
Fig.1C
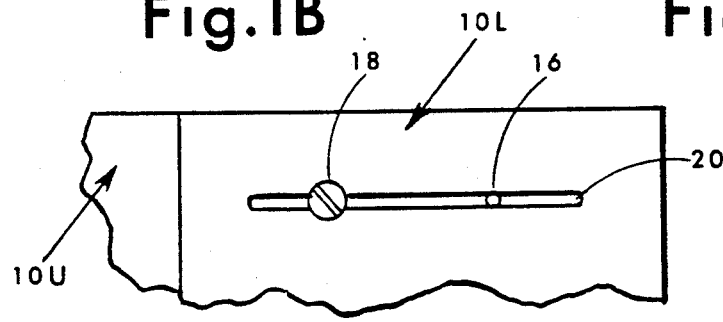
Fig.1BIS

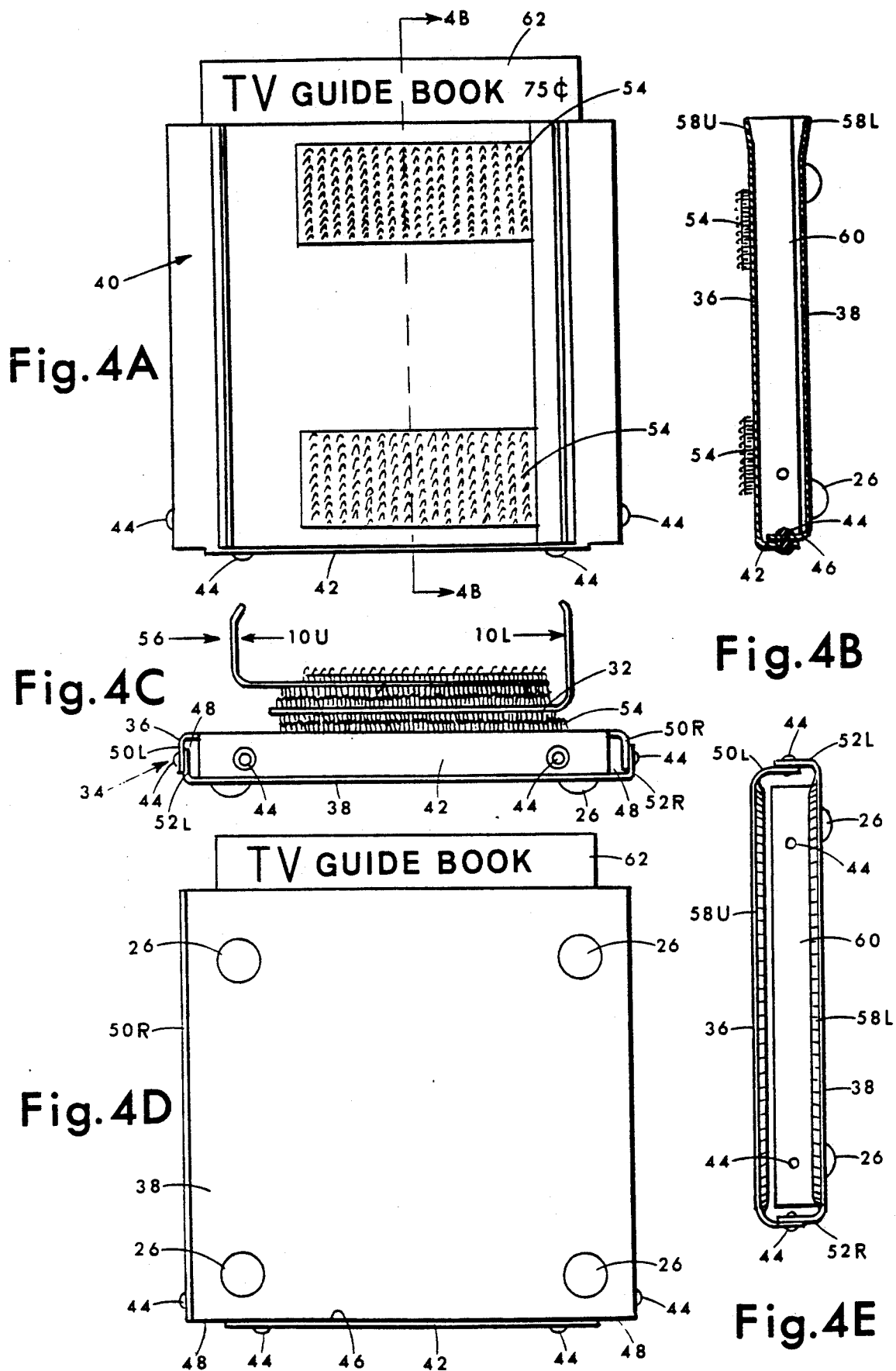

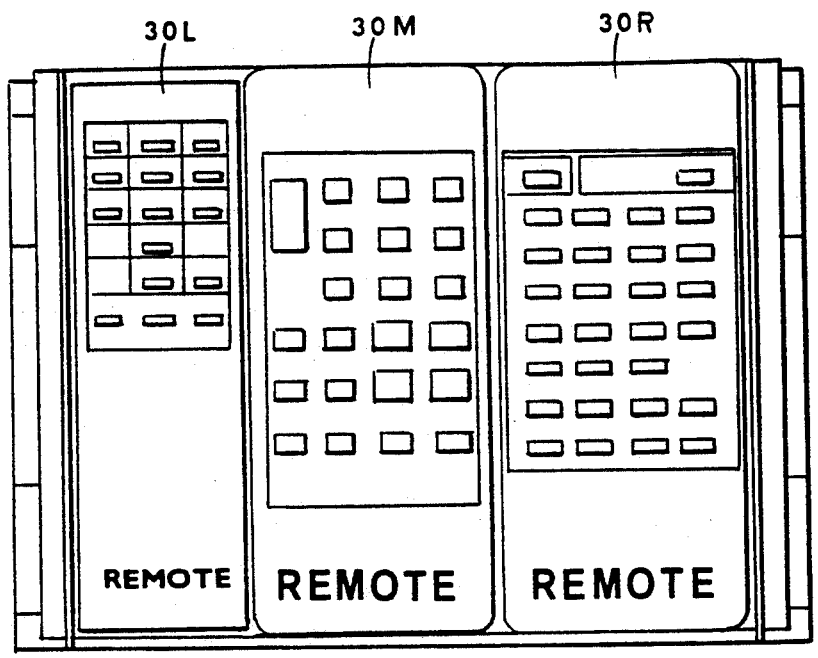
Fig. 6A
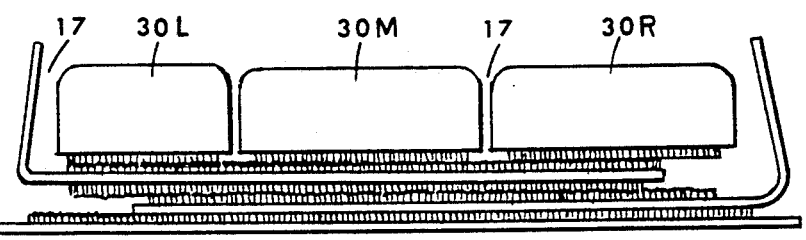
Fig. 6B
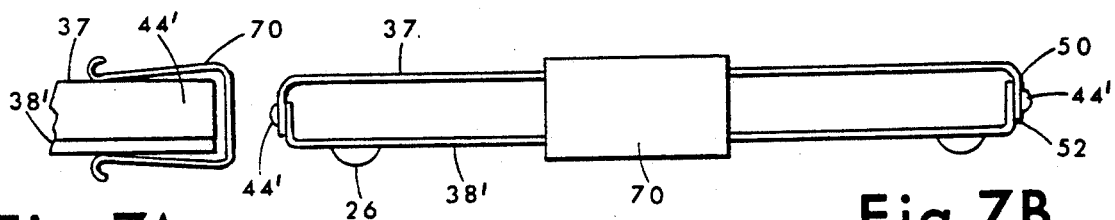
Fig. 7A  Fig. 7B
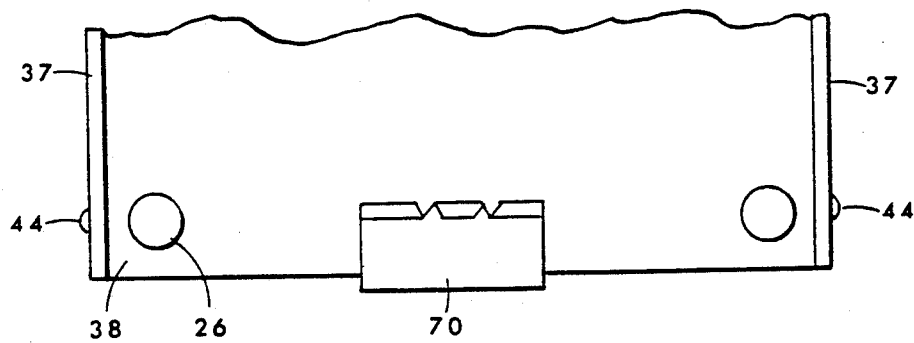
Fig. 7C
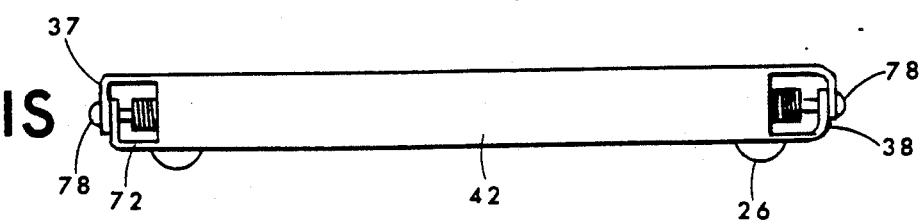
Fig. 7BIS

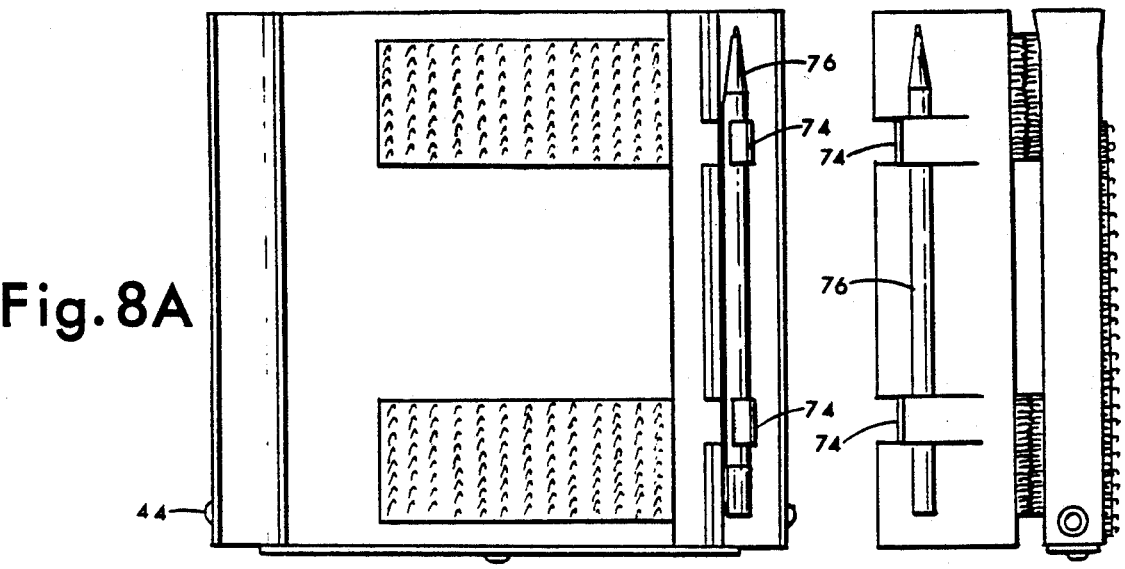
Fig.8A
Fig.8B
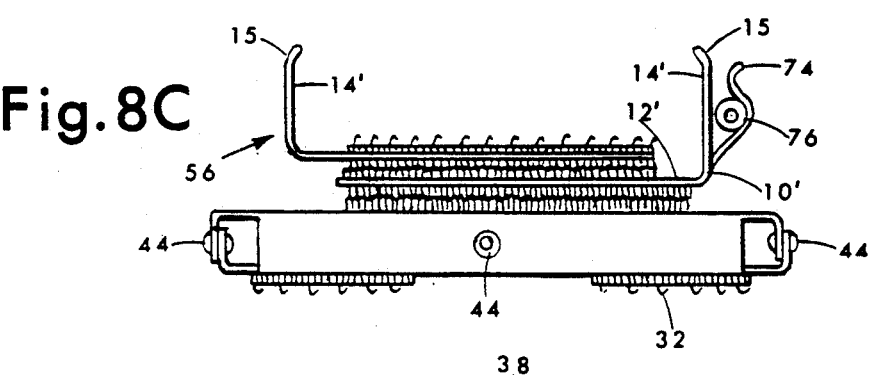
Fig.8C
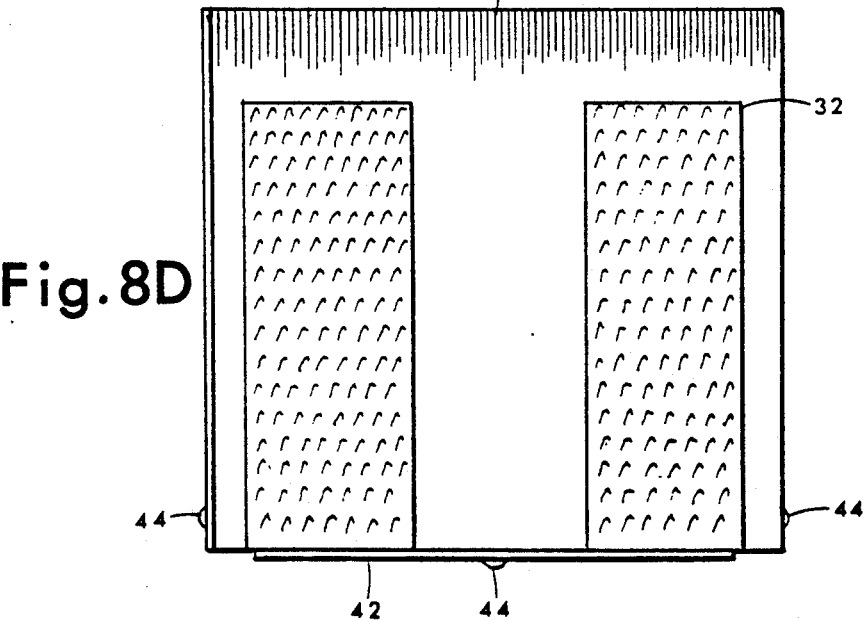
Fig.8D

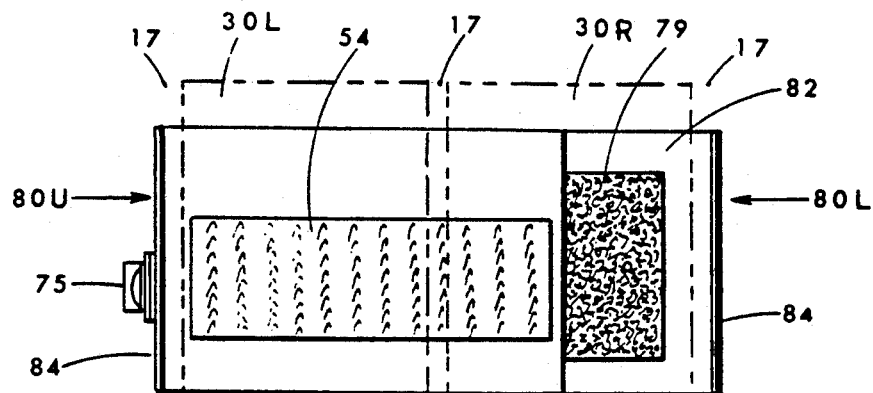
Fig. 9A
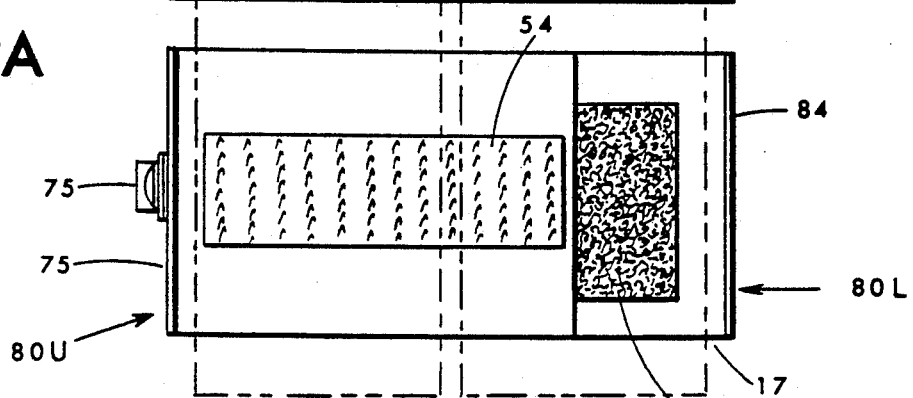
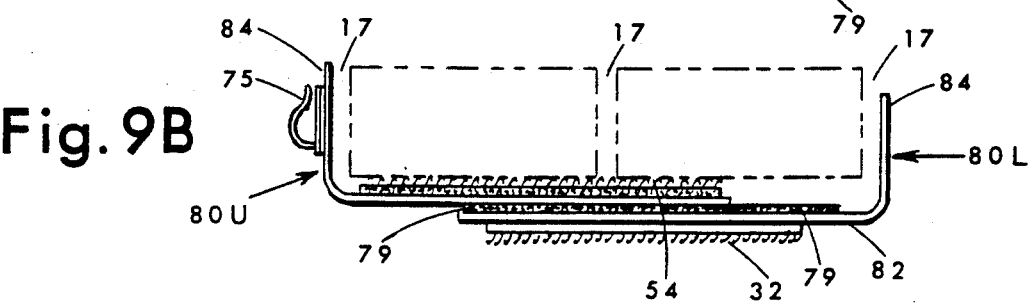
Fig. 9B
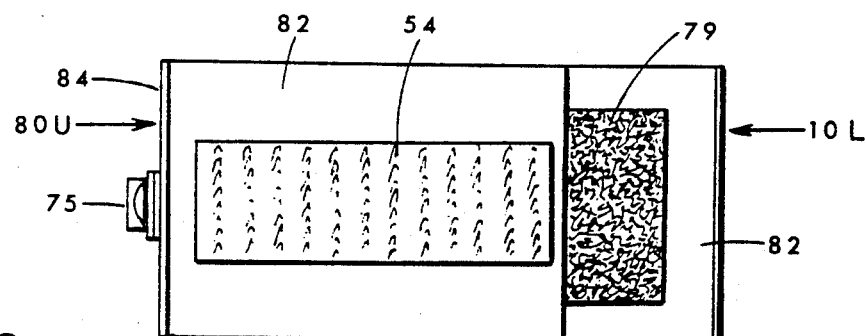
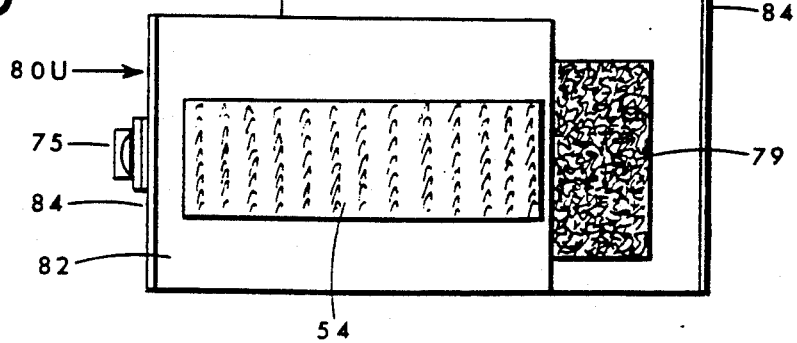
Fig. 10

HOLDER FOR ELECTRONIC EQUIPMENT ACCESSORIES

This application is a division, of application Ser. No. 07/638,999, filed Dec. 17, 1991, now U.S. Pat. No. 5,127,615, issued Jul. 7, 1992.

BACKGROUND

1. Field of the Invention

This invention relates generally to holders of accessories for electronic equipment, specifically to devices for holding a TV guidebook and a plurality of remote control (RC) units for controlling electronic equipment, such as television receivers, video cassette recorders (VCRs), audio receivers, etc.

2. Description Of Prior Art

In recent years, remote-controllable (rc) entertainment and other electronic appliances, such as televisions, VCRs, audio receivers, etc., have proliferated. Each of these appliances can be controlled (turned on and off, programmed, tuned, etc.) by a remote-control (RC) device, which usually is a small box with an infrared transmitter inside and various switches on a top surface thereof for controlling the transmitter and causing it to transmit selected codes to the appliance.

Users of such appliances usually keep their RCs on a low table in front of a sofa, on an arm of a sofa, on a bedside night table, on a bed headboard, etc. However when a user owns several rc appliances, such as a TV, a VCR, an audio receiver, etc., he or she also must use and store a respective number of RCs. Storing or keeping several RCs in any of the foregoing places thus became difficult since the units can be mixed, disorganized, lost under other equipment, sofa cushions, books, papers, etc.

In addition, users of such RCs usually keep a schedule of entertainment programs and other reference material, such as a television guidebook, a cable TV guide, etc., near their RCs. The need to store these written reference materials, in addition to the RCs themselves, compounds the problem of the previous paragraph.

Various devices for holding RCs are available, but these all have certain drawbacks. Rogalski, in U.S. Pat. No. 4,660,792 (1987) shows an RC holder, but this device is not capable of holding RCs of various sizes. Butler, in U.S. Pat. No. 4,739,897 (1988) shows a boxlike RC holder, as do others, but these devices are large, awkward, and is inconvenient to use quickly and easily. Butler, in U.S. Pat. No. 4,686,745 (1987) also shows a two-RC holder, but this device must be flipped to be used, and does not handle reference materials. Striplin, in U.S. Pat. No. 4,712,693 (1987) shows a three-RC holder, but this device is also large, awkward, and inconvenient to use quickly and easily. Ferrante, in U.S. Pat. No. 4,815,683 (1989) shows an RC holder which can be attached to the side of a TV, but this device will not store the RCs in a place which is convenient for the user.

Objects And Advantages

Accordingly, several objects and advantages of the invention are to provide an improved device for storing and keeping RCs in an organized, neat, and easily and quickly accessible manner, and to provide a way also to store and keep written reference materials in association with such RCs in such a manner. Other objects and advantages are to prevent mixing of RCs, to prevent loss of RCs, to keep RCs and their associated written reference materials in a convenient manner, etc. Further objects and advantages are to provide an improved device for holding several RCs, even if they have varying sizes, to provide a holder which is very light in weight, compact, does not have to be flipped or rotated to be used, and which can store several RCs in a place which is convenient for the user.

Further objects and advantages will become apparent from a consideration of the ensuing description and the accompanying drawings.

DRAWING FIGURES

In the description, a group of drawing figures with a common number and different respective suffixes (e.g., FIG. 1A, 1B, etc.) will be designated by their FIG. number without the suffix, e.g., "FIG. 1". Also, letter suffixes on reference numerals have the following meanings: L=left, M=middle, R=right, U=upper, B=bottom.

FIG. 1A is a perspective bottom view of a holder for a plurality of RC units according to a basic embodiment of the invention wherein a plurality of L-shaped members are adjustably held together with screws and a plurality of threaded holes. FIG. 1B is a bottom view of the holder of FIG. 1A. FIG. 1C is an end view of the holder of FIG. 1A. FIG. 1-Bis is a partial bottom view of a holder similar to that of FIG. 1A, but with a screw-and-slot adjustment mechanism.

FIG. 2A is a top view of a holder similar to that of FIG. 1, but with a hook-and-loop (H&L) adjustment mechanism and a H&L RC holder. FIG. 2B is an end view of the holder of FIG. 2A. FIG. 2C is a bottom view of the holder of FIG. 2A showing a manufacturer's label incorporating a cable-broadcast station log.

FIG. 3A is a top view of a RC holder similar to that of FIG. 2A, but with two RC units therein. FIG. 3B is an end view of the assembly of FIG. 3A. FIG. 3C is a bottom view of the assembly of FIG. 3A.

FIG. 4A is a top view of a holder for a TV guidebook in accordance with the invention. FIG. 4B is a side sectional view of the holder of FIG. 4A taken along the plane indicated at 4B—4B of FIG. 4A. FIG. 4C is a rear end view of the holder of FIG. 4A, together with an attached holder (similar to that of FIG. 3A) for a plurality of RC units. FIG. 4D is a bottom view of the holder of FIG. 4A. FIG. 4-E is a front end view of the holder of FIG. 4A.

FIG. 5A is a top view of a combination RC- and TV-guidebook holder with a H&L adjuster and RC support bosses. FIG. 5-B is a partial front end view of the holder of FIG. 5A, showing the adjustable L-shaped upper member. FIG. 5-C is a partial rear end view of the holder showing the fixed L-shaped member. FIG. 5D is a bottom view of the holder of FIGS. 5A-C.

FIG. 6A is a top view of a holder with an H&L adjuster. FIG. 6B is an end view of the holder of FIG. 6A showing a pallet extender at the bottom.

FIG. 7A is a partial side view of a clamshell-type guidebook holder showing a clamp holding mechanism. FIG. 7B is a rear end view of the holder of FIG. 7A. FIG. 7C is a bottom view of the holder of FIG. 7A. FIG. 7-Bis is a rear view of an alternative clamshell guidebook holder showing a torsion spring closing mechanism.

FIG. 8A is a top view of a combination RC and TV guidebook holder with an H&L adjuster and an integral pencil holder. FIG. 8B is a side view of the holder of FIG. 8A. FIG. 8C is an end view of the holder of FIG. 8A. FIG. 8D is a bottom view of the holder of FIG. 8A.

FIG. 9A is a top view of an RC holder similar to that of FIG. 3A, but with two separate cradles (four L-shaped members). FIG. 9B is an end view of the holder of FIG. 9.

FIG. 10 is a top view of an RC holder similar to that of FIG. 9, but with a single cradle and three L-shaped members.

Drawing Reference Numerals

Figure 2A:
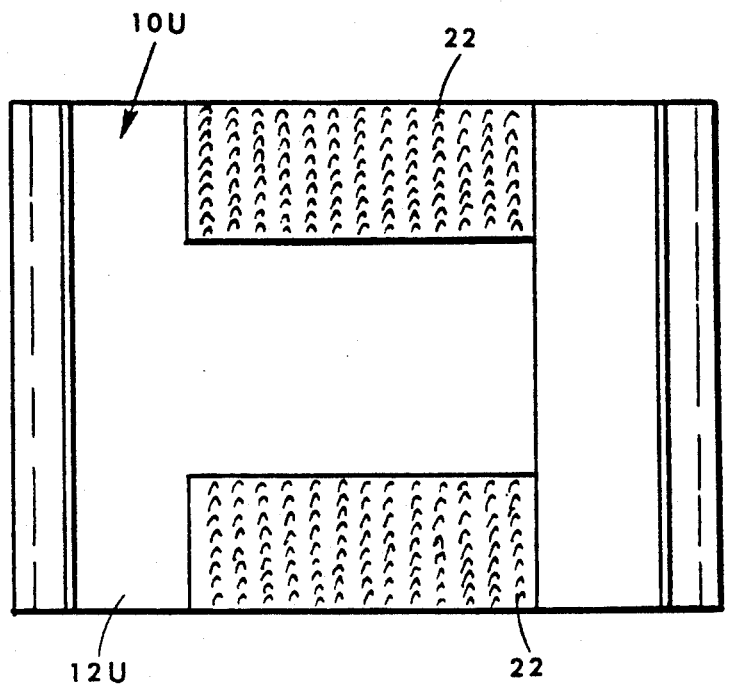

| | |
|---|---|
| 10 L-shaped member | 12 long portion of 10 |
| 14 short portion | 15 bend in short portion 14 |
| 16 row of holes | 17 definition gap |
| 18 screws | 20 slot |
| 22 H & L strip | 24 mated H & L pair |
| 26 support nubbins | 28 cable guide sticker |
| 30 RC unit | 32 hook strips |
| 34 schedule holder | 36 upper plate |
| 37 wide upper plate | 38 lower plate |
| 40 flat portion | 42 top end flap |
| 44 rivet | 46 bottom end flap |
| 48 gaps | 50 upper side flaps |
| 52 lower side flaps | 54 part of H & L strip |
| 56 RC holder | 58 flaring ends |
| 60 space | 62 TV schedule book |
| 64 RC support boss | 66 integral assembly |
| 67 short portion of 66 | 68 endface of 66 |
| 69 palllet support | 70 clamp |
| 72 spring | 74 integral tang |
| 75 attachable clip | 76 pencil |
| 78 hinge pin | 79 double-stick-side tape ("tape") |
| 80 small L-shaped member | 82 long portion of 80 |
| 84 short portion of 80 | |

FIGS. 1A to 1C—Basic RC Holder

In accordance with a basic embodiment of the invention, an RC holder for television, VCR, and other rc units comprises (FIG. 1) a pair of upper and lower generally L-shaped members 10U and 10L. Each member (preferably made of aluminum or plastic) comprises a longer portion 12 about 15 cm long (vertical dimension in FIG. 1B) by about 10 cm wide (vertical dimension in FIG. 1C) and an integral shorter portion 14 about 2 cm long (horizontal dimension in FIG. 1C). Each shorter portion includes a bend 15 of about 20° and about 5 mm from its free edge.

Members 10U and 10L each have two rows of holes 16 in their longer portion, spaced apart about 4. 5 mm; the holes in upper member 10U are threaded. A pair of screws 18 extend through two pairs of aligned holes to hold the members together.

As can be best seen in FIGS. 1A and 1C, the holder forms a cradle, the width of which, as measured between the shorter portions, can be adjusted from about 10 cm to 15 cm, or, in a larger version, from about 14 cm to 22 cm. The height of the cradle is about 25 mm; it is slightly higher on its right side (upper side in FIG. 1C) since the thickness of long portion 12 of member 10U is present.

FIG. 1-Bis—Holder With Screw-And-Slot Adjuster

In lieu of holes, member 10L may have a slot 20 (FIG. 1-Bis). Screws 18 in FIG. 1-Bis) extend through slot 20 into holes 16 in member 10U. As before, the cradle formed by the embodiment of FIG. 1-Bis is adjustable in width from about 9 cm to 15 cm, or, in a larger version, from about 14 cm to 22 cm.

Figure 2B:
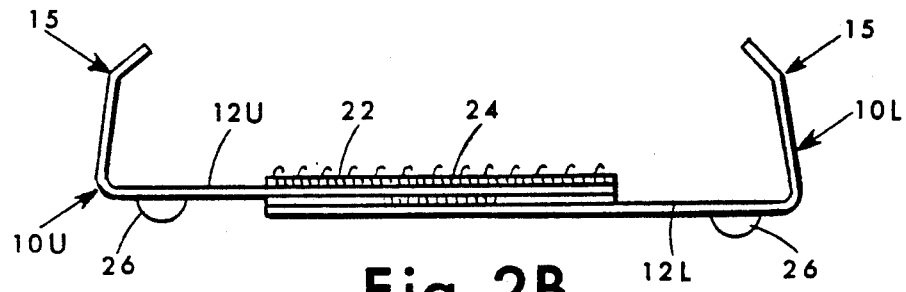
Figure 2C:
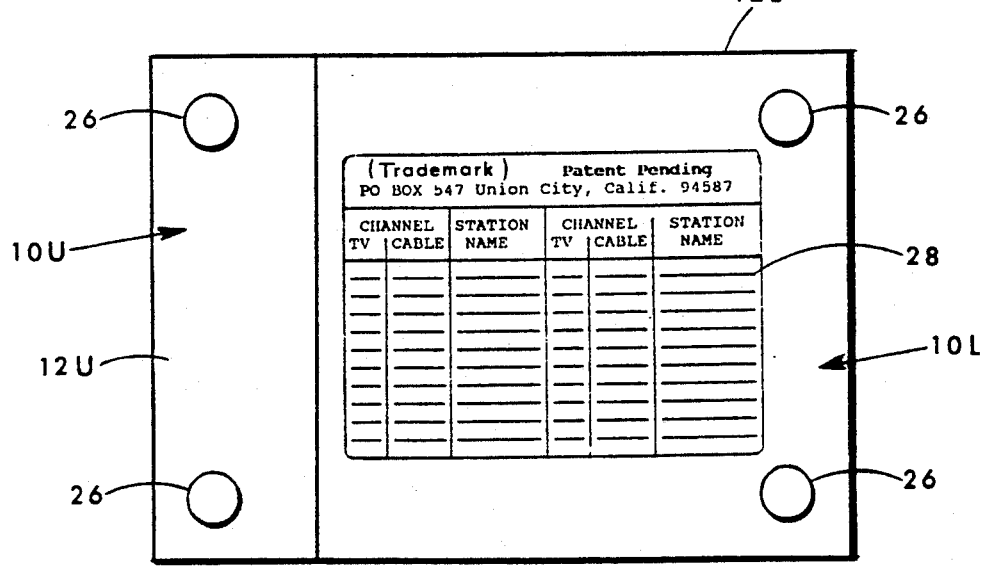

FIGS. 2A To 2C—Holder With H&L Adjuster And RC Holder

The holder of FIGS. 2A to 2C is similar to that of FIG. 1, except for the following additions: Long portion 12 of member 10U has adhered thereto a pair of strips 22, which comprise the loop halves of a pair of hook-and-loop (H&L) strips. Strips 22 are each about 8 cm long and 25 mm wide are attached adjacent the righthand edge of portion 12. Also, in lieu of screws and mating holes and slots, a mated pair of H&L strips 24 is positioned between members 10U and 10L to adjustably attach these members together. Strips 24 are about 8 cm long by about 25 mm wide. In FIG. 2 (and all subsequent embodiments) in lieu of two strips, a single strip, or more than two strips, can be used. Also portion 12 can be covered completely by a single strip, or a plurality of squares, circles, etc.

Further, portions 12 of members 10U and 10L each have have a pair of surface nubbins, supports, standoffs, or bosses 26 attached so as to provide four supports as shown in FIG. 2C. Each nubbin may be formed of rubber or other similar soft material, about 5 mm high by about 1 cm in diameter and adhesively secured to its member. Strips can be substituted for the nubbins. In addition to support, the nubbins prevent the holder from slipping on a smooth surface. Lastly, adhesively secured to the bottom of portion 12 of member 10L is a cable guide sticker 28 which provides a list of broadcast channels and their respective cable counterparts. Guide 28 is approximately 7 cm by 9.5 cm.

While strip 22 is shown as the loop half of the H&L pair, in all embodiments the the loop and hook halves can be interchanged.

Figure 3A:
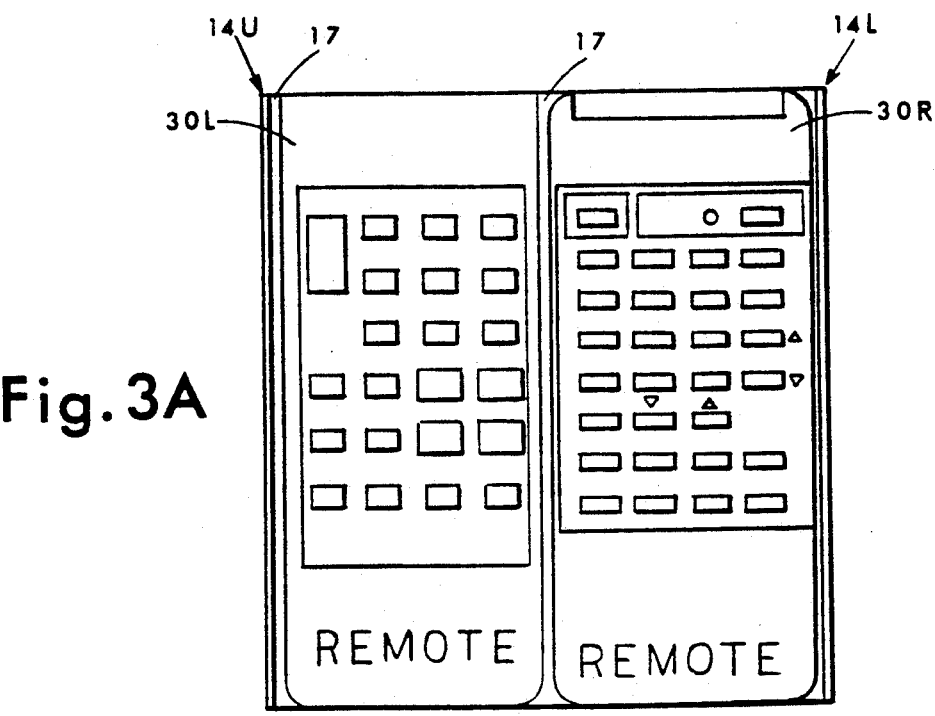
Figure 3B:
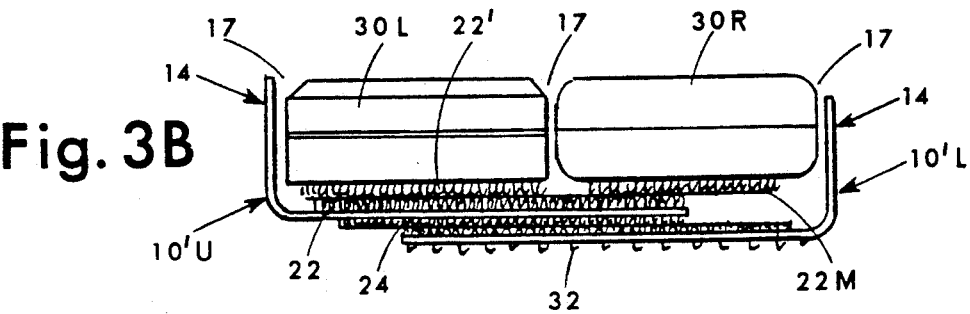
Figure 3C:
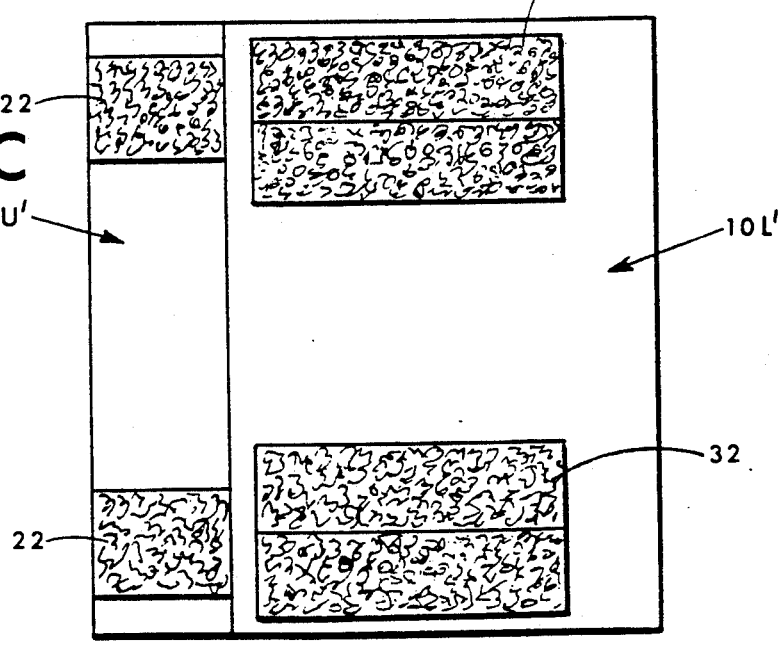

FIGS. 3A To 3C—Holder With RC Units

FIGS. 3A to C show views of an RC holder similar to that of FIG. 2, but wherein the sides of L-shaped sections 10'(U&L) have straight (presently preferred) short portions 14'', a pair of RC units 30L and 30R are positioned in the cradle formed by the holder, and the bottom of the holder has two loop strips 32 of one side of a H&L fastener for attaching the holder to a magazine holder, described infra. In FIG. 3B, as well as subsequent Figs., small definition gaps 17 are shown between the RC units and the side portions 14'. These gaps are shown to illustrate the parts clearly. However in an actual device, the RC units contact each other and the side portions. This arrangement, in addition to the hook-and-loop arrangement mentioned below, holds the RC units snugly and prevents them from pivoting out in case the holder is lifted by the RC units, rather than its base or its side.

The use of straight, short, equal length portions 14'' in lieu of bent-in sections provides a simpler assembly and one which can accommodate higher RC units. Also portions 10L' and 10U' can be made in common or identical. It is shown in these figures to illustrate a ramification. Other shapes are shown in subsequent Figs.

As in FIG. 2, the bottom of the cradle contains loop halves 22 of a pair of H&L strips. A pair of mating hook halves 22' are attached to the bottoms of RC units 30 by adhesive and mating hook halves 22' are mated with loop halves 22 as shown. The use of H&L attachment strips for the RC units allows them to be removed and replaced easily, e.g., to change their batteries. Also it enables them to be bar code programmed when they have this capability.

As indicated, the cradle formed by the two L-shaped members is adjusted and locked in position using mating H&L strips 24 or by double-stick-side tape (hereinafter tape—not shown) so that its width is equal to the combined widths of the two RC units, thereby to hold them snugly. The holder can be made to accommodate a variable number of RC units by making the L-shaped members wider.

The holders of FIGS. 1 and 2 will accommodate RC units in the same manner as the holder of preferred FIG. 3. The holder of FIG. 1 lacks any H&L fastener strips in its bottom, but its bent-over short portions 14" will hold plural RC units in a side-by-side relationship as in FIG. 3. In addition, the L-shaped members can be more securely attached using tape (preferably foam—not shown) with two opposing sticky sides between the L-shaped members.

FIGS. 4A To 4E—Holder For RCs And TV Guidebook

As shown in FIG. 4C, the RC holder may be attached to an underlying TV schedule or guidebook holder 34 so that the user's RC units and guidebook will all be conveniently held in one device. Holder 34 comprises identical upper and lower plates 36 and 38. Upper plate 36 comprises a large flat portion 40 about 15.5 cm by 15.5 cm with an integral, bent down bottom end flap 42 (about 1.5 cm by 14 cm) which is attached by rivets 44 (or by welding or bonding) to a corresponding integral, bent up bottom end flap 46 (FIG. 4B—not shown in FIG. 4C but behind top end flap 42) on lower plate 38. Thus the bottom end of holder 34 is closed, except for small gaps 48 at each end. (Gaps 48 are immaterial in the version of FIG. 5 and 7-Bis, but are useful in other versions to allow plates 36 and 38 to mate.)

A tensioning mechanism (best seen in FIG. 4B) can be provided by making end flaps 42 and 46 of resilient materials and positioning them at an angle of about 93° to upper and lower plates 36 and 38. Thus when the end flaps are compressed and riveted together, the plates become tensioned.

Upper plate 36 (which is identical to lower plate 38) also has two integral, bent down side flaps 50L and 50R (each about 1.5 cm by 15.5 cm) which is attached at the rear portion of the guidebook holder side flaps by rivets 44 (or by welds or bonding) to integral, bent up side flaps 52L and 52R of lower plate 38. As shown in FIGS. 4C and 4E, on the right side, upper side flap 50R is inside lower side flap 52R, while on the right side, upper side flap 50R is outside lower side flap 52R. On the bottom, bottom end flap 42 is outside bottom end flap 46. The bottom of plate 38 has four support nubbins 26 attached thereto. A station log sticker (not shown) can be affixed to flat portion 40 for reference. Also a hook portion of a H&L fastener (not shown) can be attached to enhance the unit's ability to adhere to cloth furniture.

Upper and lower plates 36 and 38 have flaring upper and lower ends 58U and 58L (FIGS. 4B and 4E) to provide an easy lead-in to the space 60 between these plates. Space 60 is rectangular, about 15.2 cm by 15.2 cm by 1.5 cm in size, and is arranged to accommodate a television or radio guidebook or schedule 62 (FIGS. 4A and 4D). The surfaces forming this space may be roughened to enhance the ability of guide holder 34 to retain the magazine. Constructing the side flaps 50 and 52 with a front-to-back taper (not shown) will allow schedule books with wider variations in thickness to be held.

Bottom plate 36 has two loop strips 54 of one part of a H&L fastener pair adhered thereto. Each strip is about 8 cm by 2.5 cm and the strips are attached across plate 42, about 9.5 cm apart and about 20 mm from each end. These strips are used to attach a mating RC holder 56 (FIG. 4C) which is similar to that of FIG. 3. Holder 56 has mating H&L strips 32 which are attached to strips 54, thereby to removably attach holder 56 to the underlying guidebook holder. For ease of illustration, the thicknesses of the H&L strips is exaggerated in FIG. 4C. Additional guidebook holders (not shown) can be attached or stacked under holder 34 to accommodate plural guidebooks, e.g., for broadcast, cable, etc. guidebooks.

By virtue of upper RC holder 56 and the lower guidebook holder 34, the reader will see that I have provided a complete, adjustable, and very light in weight usage kit whereby one may conveniently house a TV/radio guidebook and remote control units for controlling the electronic entertainment units in one convenient, easy-to-handle package. The guidebook may be conveniently inserted and withdrawn from space 60. The RC units (not shown in FIG. 4) will be held together and can be handled and used with one hand by aiming the entire combined holder and pressing the appropriate buttons. Also, the RC units and guidebook that are held together provide a very stable platform: after it is placed on a user's leg or furniture, the RC buttons can simply be pressed firmly enough to actuate their functions without moving the entire assembly.

FIGS. 5A to 5D—Integral Holder With RC Bosses

Figure 5A:
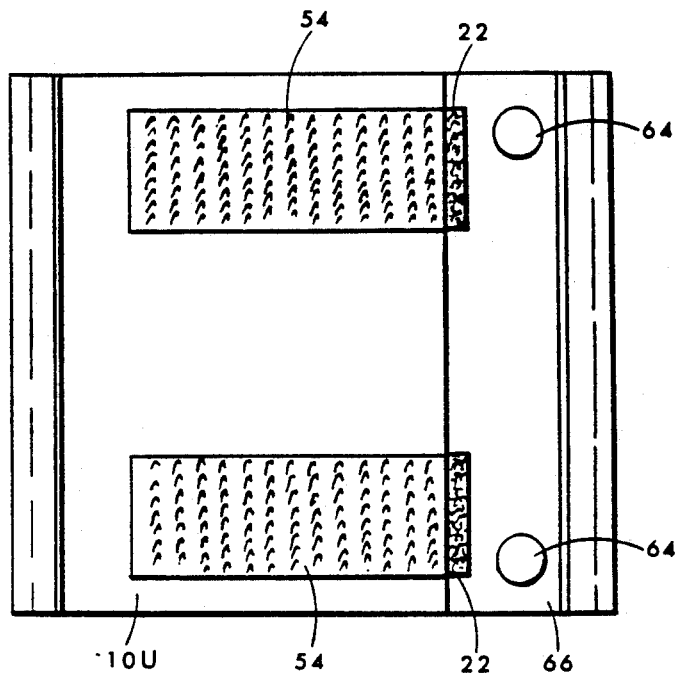
Figure 5B:
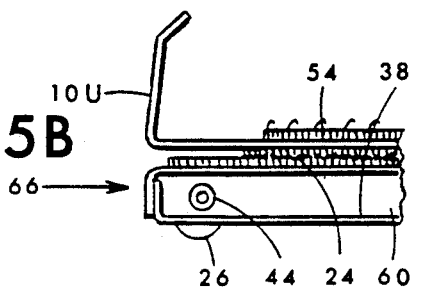
Figure 5C:
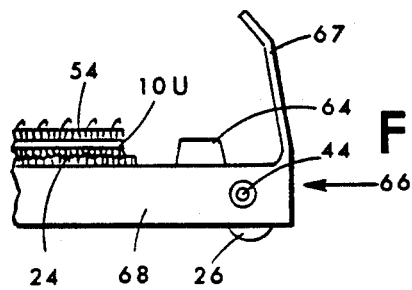
Figure 5D:
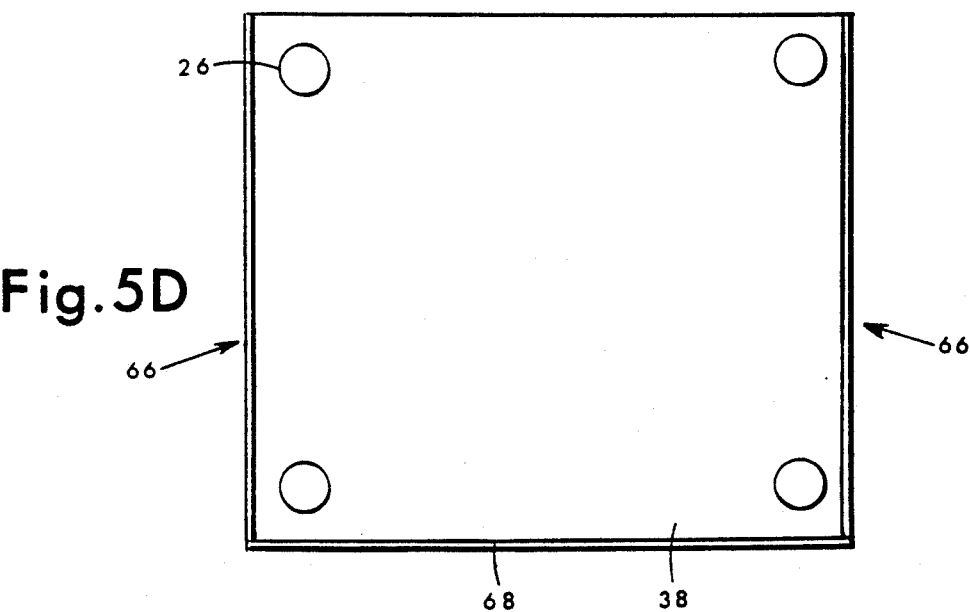

FIGS. 5A to 5D show a RC and guidebook holder similar to that of FIG. 4, but wherein a pair of RC support bosses 64 are attached to an integral unit. Integral unit 66 is an integral combination of upper plate 37 width integral side flaps 52 and L-shaped portion 10L with a lower plate 38 inset from below, as shown in FIG. 5D. Bosses 64 support the right side of the right-hand RC unit, such as unit 30R of FIG. 3B, when placed in the cradle of the holder. As can be seen in the rear end view of FIG. 5-C, bosses 64 have a height (about 5 mm) which correctly matches the height of upper L-shaped member 10U, thereby providing a level platform for both RC units (not shown in FIG. 5). Bosses 64 preferably are made of rubber and can be attached by adhesive or plug-in legs on their bottoms (not shown).

Members 10U and 66 are adjustably attached by H&L strips 22, as in FIG. 4, or tape (not shown). The RC units are removably attachable to the bottom of the cradle by H&L strip 54 and mating strips, circles, etc. on the bottom of the RC units, as shown at 22' in FIG. 3B.

FIG. 5B shows a partial front end view of an adjustable upper L-shaped member 10U attached with a H&L fastener (or tape—not shown) to integral unit 66. As indicated in the bottom view of FIG. 5D, a lower plate 38 is set into integral unit 66 and shows four support bosses 26.

In lieu of attaching the schedule and RC holders together by H&L fasteners, tape, or other means, they may be made integral or with a one-piece mid-unit. In this case, the schedule holding portion comprises a rectangular compartment 66' which is similar to holder 34 (FIG. 4C), except that it has an integral flat bottom end face 68 an an integral short portion 67 which is similar to portion 14 (FIG. 1). This integral side portion 67 extends up from the integral rectangular schedule compartment's upper side. Side portion 67 may be formed integral with compartment 66' by stamping, molding, welding, or riveting (not shown).

FIGS. 6A & 6B—Combination RC And TV Guidebook Holder With H&L

As shown in FIGS. 6A and 6B, the RC holder can be made larger so as to accommodate additional RC units, as for A TV, VCR, audio receiver, cassette and tape players, etc. The RC holder is shown holding three RC units, i.e., left unit 30L, middle unit 30M, and right unit 30R. All three units are attached to the bottom of the cradle formed by the holder by H&L fasteners, as in FIG. 3. The RC holder itself is attached by an H&L fastener to a pallet support 69 that can add support to the L-shaped members if they are extended beyond their normal usage range.

FIGS. 7A To 7C—Clamshell Guidebook Holder

Ramifications of the underlying guidebook, magazine, or schedule holder are shown in FIG. 7. In lieu of using upper and lower plates which are permanently attached together and with bottom end flaps (42 and 46 in FIG. 4), the plates may be hinged with a binder or torsion-type spring so that the guidebook (not shown in FIG. 7) can be easily placed within. Thus a clamshell-type guidebook holder is shown in FIG. 7.

In the embodiment of FIGS. 7A to 7C, the end flaps are omitted, and the upper plate is wider, resulting in a modified upper plate 37. As before, the plates have bent-down side flaps 50 and 52 which are hinged together near their bottom ends by a pair of rivet pins 44' so that they can be opened (not shown) like a clamshell. Strategic positioning of these rivets allows partial opening for inserting and retaining the magazine, and at the same time restricts excessive pivoting of the plates which could dislodge the retention spring binder clamp. The bottom end may be closed by means of one or more paper clamps 70 which extend over both the upper and lower plates; the usual opening wires are shown removed. If desired, a plurality of such clamps may be used, although one is sufficient to keep the TV guidebook from falling out and to hold the hinged plates together. A plurality of support bosses 26 are attached to bottom plate 38'. Upper plate 37 is wider than lower plate 38 as shown in FIGS. 7B, 7C, and 7-Bis, described below. Such widening of the upper plate provides a neater appearance.

FIG. 7-Bis—Clamshell Holder With Spring Closing Mechanism

In lieu of clamp 70, in FIG. 7-Bis upper modified plate 37 and lower plate 38 may be constantly urged closed by a coil or torsion spring 72 which is placed around a hinge pin 78" which extends inside and completely across the holder. Spring 72 is arranged to continually urge the upper and lower plates together in their normal, spaced condition, which can be parallel or near parallel.

FIGS. 8A To 8D—Holder For RCs, Guidebook, And Pencil

FIG. 8 shows still another embodiment which can hold a plurality of RCs, a guidebook, and a pencil (or pen) which the user can use to mark programs, write notes, do crossword puzzles in the program guide or in an actual crossword puzzle magazine—which will fit into the magazine holder.

The holder is similar to the embodiment of FIG. 4, but also has a pair of integral pencil-holding tangs 74 punched or molded out of the side of righthand short portion 14' of RC holder 56. Each tang is bent as indicated, i.e., it has a lead-in free end (FIG. 8C), a main bend in its middle for holding a pencil 76, and its bottom which is integral with the bottom of portion 14' where it joins long portion 12' of L-shaped member 10'. Tangs 74 are spaced about 7–10 cm apart. Pencil 76 can easily be removed and replaced by a slight pull or pressure, respectively, yet will be held securely enough that the device can be handled and used without the pencil or pen coming out. The tangs can be replaced with separate attachable or affixable clips (not shown) in this version and, as shown at 75, in the version of FIG. 9) to hold the pencil or pen. Clips 75 can be attached to either side of the holder for left- or right-handed persons. By using these clips, the L-shaped members can be identical. Clips 75 allow more versatility in the manufacturing process. (The identical L-shaped members can be stamped, molded, or extruded.)

FIGS. 8B, C, and D show the bottom of the holder with the hook portion of the H&L fastener attached. This adds an antislip capability to units placed on cloth furniture, similar to the manner in which rubber bosses or strips (not shown) provide this capability on hard-surfaced furniture.

FIGS. 9A And 9B—Holder With Two Separated Cradles

The RC holder of FIGS. 9A and 9B is similar to that of FIG. 3 except for the following additions and changes: the L-shaped members have been segmented into two smaller sections to provide two separate cradles, one being shown above the other in FIG. 9A. Each cradle has two L-shaped members, 80L and 80U. Each L-shaped member comprises a long portion 82 about 7 cm long (vertical dimension in FIG. 9A) by about 10 cm wide (horizontal dimension in FIG. 9A) and an integral short portion 84 about 2 cm long (vertical dimension in FIG. 9A).

The two separated cradles are shown holding two RC units 30L and details of the cradles. 30R. RCs 30L and 30R are shown in phantom so as not to obscure the Since both RCs are joined by the H&L fasteners to both cradles, they hold the separated cradles together, and vice-versa. Since the cradles are separated, one can easily adjust their spacing so that they can appropriately hold RCs of a wide range of lengths.

The H&L adjustment strips which hold the two L-shaped members of the cradle together can be replaced with double-stick-side tape in any embodiment where such H&L strips are used. Such tape is used at 79 in FIG. 9.

FIG. 10—Single Holder With Three L-Shaped Members

FIG. 10 shows a version of the holder of FIG. 9 with a standard L-shaped member 10U substituted for the two small L-shaped members 80L on one side of the holder. This version thus provides a single cradle and has three L-shaped members, one of which (10L) is common to and mates with the other two (80U). This version is more rigid than that of FIG. 9, yet still retains the ability to make a lengthwise adjustment on one side.

Summary, Ramifications, And Scope

The reader will see that I have provided a holder for accessories for electronic equipment which is generally improved, which holds the equipment in an organized, neat, and easily and quickly accessible manner, and which provides a way also to store and keep written reference materials in association with such RCs in such a manner. It also prevents mixing of RCs, loss of RCs, and keeps RCs and their associated written reference materials in a convenient manner. It can hold several RCs, even if they have varying sizes, it is compact, very light in weight, does not have to be flipped or rotated to be used, and can store several RCs in a place which is convenient for the user.

Although my holder has been shown and described with reference to specific embodiments, these specific embodiments, their parts, materials, and configurations have been given only as examples, and many other modifications are possible. For example, the holder may be made of different materials than metal, such as plastic, ceramics, composites, rubber, or wood. The shapes of the sides of the RC holder can be varied, as can the method of attaching the long sides of the L-shaped members together. The bottom, guidebook holder can be made in different shapes, with different constructions, and with different end closures and means of hinging. the upper and lower units can be attached together by different means, such as snaps, tape, catches, tongues and grooves, etc. Additional accoutrements can be added, such as a clock, a lamp, a writing tablet, a small food or pill holder, etc.

Therefore, the scope of the invention should be determined not by the examples given, but by the appended claims and their legal equivalents.

I claim:

1. A holder for a plurality of electrical devices, comprising, in combination:
    a cradle having a floor, said floor having ends at opposite sides of said floor,
    said cradle also having a plurality of spaced, parallel sides extending up from said ends of said opposite sides of said floor in a generally normal orientation to said floor,
    said cradle comprising a pair of thin plates which each have a large portion and a small portion, said large and small portions of each plate being joined to form an "L" shape,
    the long portion of each of said plates having two opposed major faces which face in opposite directions which are generally parallel to said short portions of said plates, one major face being a top face and facing upwardly in the same direction as said short portions extend from said long portions, the other major face being a bottom face and facing downwardly in a direction opposite to that in which said short portions extend from said long portions,
    said long portions of said pair of plates being positioned adjacent each other in a face-to-face relationship so that said long portions overlap, when seen from above said cradle in a direction parallel to said short portions of said plates, said top face of one long portion facing said bottom face of said other long portion,
    said long portion of each of said plates being joined to said short portion by an integral, orthogonal bend,
    said cradle including adjusting and holding means comprising at least one section of tape having two major faces which face in opposite directions with adhesive on both of said faces, said section of tape being positioned between and attached to said long portions of said plates for adjustably joining said long portions directly together in said face-to-face relationship so that said top face of one long portion faces and lies directly adjacent and parallel to said bottom face of said other long portion, and so that said long portions combine in overlapping relation to form said floor of said cradle and said small portions of said plates form said sides of said cradle, said adjusting and holding means joining said long portions directly together whether or not any of said electrical devices are positioned within said cradle,
    said long portions of said plates and said adjusting and holding means also being sized to enable the degree of overlap between said long portions, and the width of said floor between said spaced sides and the spacing between said sides, to be adjusted so that a plurality of said electrical devices of predetermined sizes can be positioned directly on said floor in a side-by-side relationship and held between and by said sides in a snug manner.

2. The holder of claim 1 wherein said section of tape is foam tape.

3. The holder of claim 1, further including said plurality of electrical devices and wherein said floor of said cradle has one part of a hook-and-loop fastener affixed thereto and wherein said plurality of said remote-control devices each have the mating part of said hook-and-loop fastener attached to an underside thereof, said plurality of electrical devices being removably positioned in said cradle and being attached to said floor by said hook-and-loop fasteners.

4. A holder for a plurality of elongated electrical devices, comprising, in combination:
    a pair of cradles, each having a floor, said floor having ends at opposite sides of said floor, one of said cradles being a top cradle and the other being a bottom cradle, said bottom cradle and said top cradle being positioned adjacent each other in a given direction,
    each of said cradles also having a plurality of spaced sides extending up from said ends of said opposite sides of said floor in a generally normal orientation to said floor, said spaced sides being parallel to said given direction,
    each of said cradles comprising a pair of thin plates which each have a large portion and a small portion, said large and small portions of each plate being joined to form an "L" shape,
    the long portion of each of said pair of plates having two opposed major faces which are generally parallel and which face in opposite directions which are generally parallel and which face in opposite directions which are generally parallel to said short portions of said plates, one major face being a top face and facing upwardly in the same direction as said short portions extend from said long portions, the other major face being a bottom face and facing downwardly in a direction opposite to that in which said short portions extend from said long portions,
    said long portions of said pair of plates being positioned adjacent each other in a face-to-face relationship so that said long portions overlap, when seen from above said cradle in a direction parallel to said short portions of said plates, said top face of one long portion facing said bottom face of said other long portion, said long portion of each of said plates being joined to said short portion by an integral, orthogonal bend, each pair of said plates including adjusting and holding means positioned between and attached to said long portions of said plates for adjustably joining said long portions directly together in said face-to-face relationship so that said top face on one long portion faces and lies directly adjacent and parallel to said bottom face of said other long portion, and so that said long portions combine in overlapping relation to form said floor of said cradle and said small portions of said plates form said sides of said cradle, said adjusting and holding means joining said long portions directly together whether or not any of said electrical devices are positioned within said cradle, said long portions of said plates and said adjusting and holding means also being sized to enable the degree of overlap between said long portions, and the width of said floor between said spaced sides and the spacing between said sides, to be adjusted so that a plurality of said electrical devices of predetermined sizes can be positioned directly on said floor in a side-by-side relationship and held between and by said sides in a snug manner, said plurality of elongated remote-control devices being positioned in said cradles so that their directions of elongation are parallel to said given direction and so that devices are arranged in a side-by-side relationship, a top portion of each of said devices lying in said top cradle and a bottom portion of each of said devices lying in said bottom cradle, and adhesive means for adhesively holding said cradles to said electrical devices so that when said devices are positioned in said cradle, said devices will hole said cradles in a fixed relationship to each other.

5. The holder of claim 4 wherein said cradles are spaced apart in said given direction.

6. The holder of claim 4 wherein said adhesive means comprises two sets of hook-and-loop fasteners.

7. The holder of claim 4 wherein said adhesive means comprises two sections of tape with adhesive on both sides thereof.

* * * * *

UNITED STATES PATENT AND TRADEMARK OFFICE
CERTIFICATE OF CORRECTION

PATENT NO.: 5,269,484
DATED: Dec 14, 1993
PATENTEES: Wally W. Jones

It is certified that error appears in the above-identified patent and that said Letters Patent is hereby corrected as shown below:

Title page, item [54] and col. 1, lines 1-2 change, "ELECTRONIC EQUIPMENT ACCESSORIES" to —RC Holder Employing L-Shaped Members With Overlapping Faces And Holding/Adjusting Means —.

Title page, Item [62], change "Dec 17, 1991" to —Jan 7, 1991 —

Col. 1, l. 6, change "Dec 17, 1991" to —Jan 7, 1991 —

Signed and Sealed this

Third Day of May, 1994

*Attest:*

BRUCE LEHMAN

*Attesting Officer*     Commissioner of Patents and Trademarks